Figure 1:
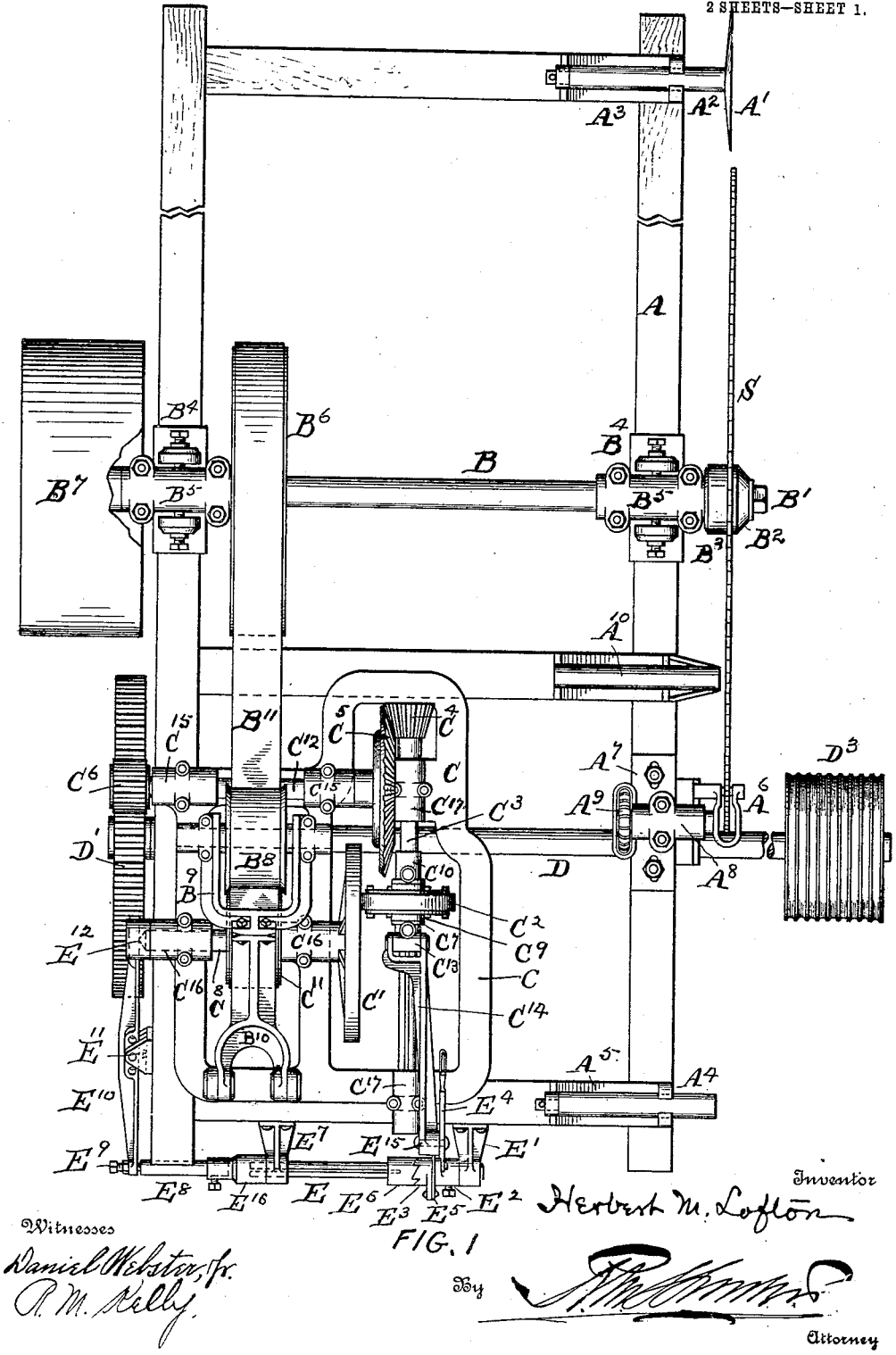

H. M. LOFTON.
GEARING.
APPLICATION FILED FEB. 29, 1908.
968,962.
Patented Aug. 30, 1910.
2 SHEETS—SHEET 2.
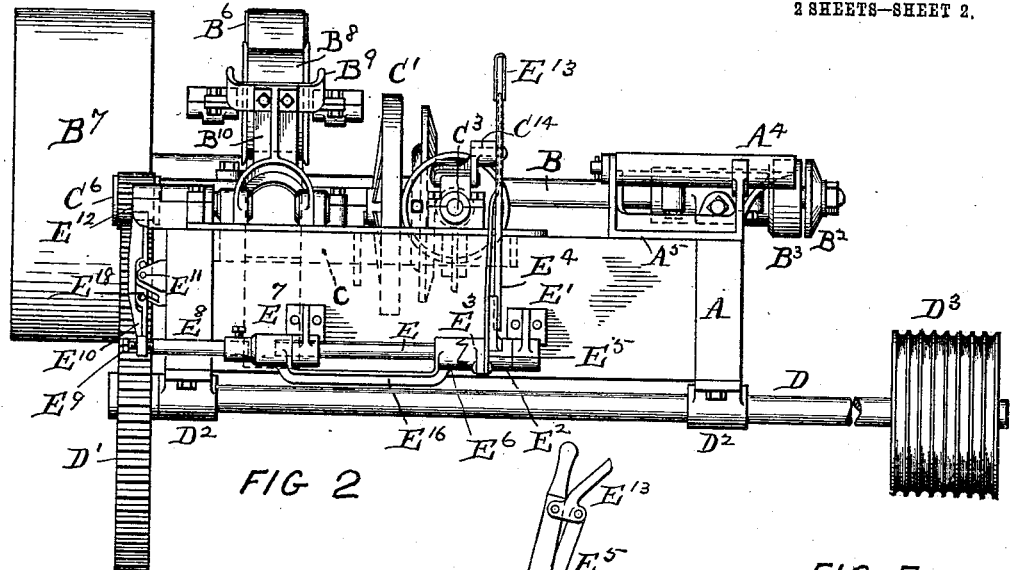
FIG. 2
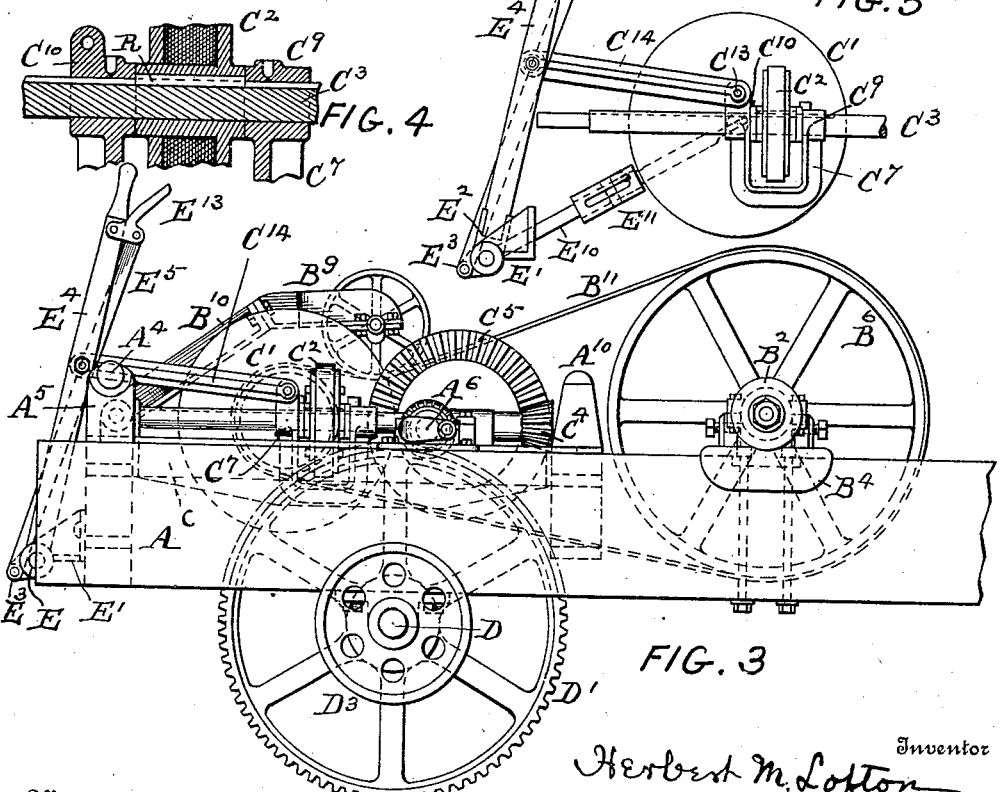
FIG. 4
FIG. 5
FIG. 3
Witnesses
Daniel Webster, Jr.
A. M. Kelly
Inventor
Herbert M. Lofton
By
Attorney

UNITED STATES PATENT OFFICE.

HERBERT M. LOFTON, OF ATLANTA, GEORGIA.

GEARING.

968,962. Specification of Letters Patent. Patented Aug. 30, 1910.

Application filed February 29, 1908. Serial No. 418,414.

*To all whom it may concern:*

Be it known that I, HERBERT M. LOFTON, a citizen of the United States, and a resident of the city of Atlanta, county of Fulton, and State of Georgia, have invented an Improvement in Gearing, of which the following is a specification.

My invention has reference to gearing for sawmills, and consists of certain improvements which are fully set forth in the following specification, and shown in the accompanying drawings which form a part thereof.

The object of this invention is to provide a reliable and simple variable friction feed for the log carriage of a sawmill, especially one that is self-contained, *i. e.*, one that has an independent husk frame whereby the feed may be mounted on any make of sawmill, and give equally good service. It is designed especially with the object of its being sensitive and susceptible to ease of control.

More particularly my object is to provide means whereby movement of a friction roll is accomplished by means of a lever moving in the direction the sawmill carriage is intended to be moved, and which lever at the same time causes the revolving disk to be pushed up to the friction roller without giving two separate motions to the main lever. In machines in common use, the friction feeds require a cross movement of the lever for varying the speed of the sawmill carriage, and then a parallel movement of the same lever to apply the friction pulley to the disk; thus making it exceedingly difficult for the operator to properly control the machine. By my improvements, this trouble has been entirely obviated.

A large number of the variable friction feeds in use have disks of some form or other, on saw mandrels, and the friction pulleys work against same. On account of the enormous pressure it takes to transmit this power through these devices the mandrel is invariably sprung in the center between its bearings, thus causing the saw to run hot besides sawing imperfect lumber. These difficulties are entirely overcome by my improvements hereinafter described.

My invention consists of a shaft driven from a friction roller shaft, combined with a friction roller on said roller shaft, a friction disk in constant rotation, and hand controlled means for forcing the friction disk and friction roller in driving contact at will of the operator and also controlling the position of contact of the friction roller with the friction disk, whereby a variable speed and reverse of rotation of the friction roller may be secured with a single direction of movement of the hand controlled means.

My invention also consists in combining the driving friction disk with means to shift it transversely to the plane of the saw to operate the friction roller and the feed drum, and hand operated devices movable in a plane parallel to the plane of the saw for operating the means to shift the friction disk.

My invention further consists of a common hand lever mechanism for shifting the friction roller to change the speed or direction of rotation and for moving the friction disk into driving contact with the friction roller, said hand lever mechanism being pivoted so that it moves only in one plane.

My invention also comprehends details of construction which, together with the features above specified, will be better understood by reference to the drawings, in which:—

Figure 1 is a general plan view of a standard sawmill husk frame with my invention mounted on same; Fig. 2 is an end elevation of the same; Fig. 3 is a side elevation of the same with one end broken away; Fig. 4 is a sectional view of the spline connection of the friction roller with the driven shaft; and Fig. 5 is an elevation of the hand operated means for adjusting the friction roller and friction disk, separated from all other mechanism.

A is the ordinary husk frame of the sawmill. B is the saw mandrel and is journaled in bearings $B^4$ $B^5$. It has a driving pulley $B^7$ and a head $B^3$ against which the saw S is clamped by collar $B^2$ and screw $B'$. At one end of the frame is a wheel spreader $A'$ having a shaft $A^2$ journaled in the bearing $A^3$, and at the other end is the board roller $A^4$, journaled in bearings $A^5$. $A^{10}$ is a stationary board stand between the mandrel and the saw guide $A^6$. This saw guide is carried in a frame $A^8$ and secured to the husk frame at $A^7$ and is provided with an adjusting wheel $A^9$ of the usual construction. These parts are all of well known construction and form no part of my invention.

C is an iron frame carrying the various parts hereafter mentioned.

$C'$ is a revolving disk mounted on the shaft $C^8$, the said shaft carrying the pulley $C^{11}$.

$C^2$ is a friction roller of paper or other material mounted on the shaft $C^3$, and arranged so that it will slide longitudinally on this shaft, but being provided with a feather key it positively rotates with the shaft.

$C^4$ is a bevel pinion secured to shaft $C^3$, and $C^5$ is a bevel gear secured to shaft $C^{12}$, carrying at its outer end a pinion $C^6$.

$C^7$ is a yoke provided at its ends with the hubs $C^9$ and $C^{10}$. These hubs are bored and work freely on shaft $C^3$. The friction roller $C^2$ works in between the hub ends of this yoke. The yoke $C^7$ also carries at one of its upper ends a lug drilled to receive the connecting rod $C^{14}$, as indicated at $C^{13}$. The friction roller $C^2$ is provided with a feather key R, causing the shaft $C^3$ to revolve with this roller. The yoke $C^7$ not only serves the purpose of moving the friction roller $C^2$ to any position on the disk that may be desired, but also serves to keep the feather key R from working out of said friction roller $C^2$ (see Fig. 4).

It will be noticed from Fig. 5 that the outer end of the shaft $C^3$ is turned down to the bottom of the splined keyway, thus permitting the yoke, the friction pulley and the feather key to be slipped over the end of this shaft without necessitating extending the spline through the journal. This arrangement also permits the yoke $C^7$ to be made solid and bored out so that the splined shaft $C^3$ will revolve freely in the same.

The disk $C'$ is mounted on shaft $C^8$ journaled in bearings $C^{16}$ and said shaft carries the pulley $C^{11}$. The bevel gear $C^5$ is mounted on shaft $C^{12}$ which is journaled in the bearings $C^{15}$ and is provided with pinion $C^6$ at its outer end. The shaft $C^3$ is journaled in the bearings $C^{17}$ on the frame C.

D is the drum shaft, having at its outer end the spur gear $D'$ meshing with pinion $C^6$, and at its inner end the drum $D^3$. This shaft is journaled in bearings $D^2$.

E shows the reversing lever shaft supported by the bracket bearings $E'$ and $E^7$. This shaft carries the reversing lever $E^4$. This lever in the particular construction shown is made fast to the shaft E. The shaft E also carries the yoke $E^{16}$, and this yoke is arranged so that it will slide longitudinally on shaft E but also revolves with the shaft. One end, $E^6$, of this yoke is fitted with cam shaped teeth, which engage similar teeth on the crank collar $E^3$. This crank collar $E^3$ works freely on the shaft. The opposite end of the yoke $E^{16}$ carries a hub, within the end of which is inserted the thrust shaft $E^8$. This thrust shaft engages an adjustable screw $E^9$ in the end of pivoted lever $E^{10}$. This lever is pivoted in brackets $E^{11}$, and at the upper end it engages the outer end of the disk shaft $C^8$. By reference to Figs. 1 and 2, it will be noticed that the pivoted lever $E^{10}$ has several holes $E^{18}$ so that the pressure against the disk shaft may be compounded to any degree desirable. Of course, in making this adjustment, the bracket $E^{11}$ will be shifted to suit the holes in the pivoted lever $E^{10}$. The crank collar $E^3$ is rotated by the link $E^5$ and pivoted secondary handle $E^{13}$ on the reversing lever $E^4$.

The pulley $C^{11}$ of the friction wheel $C'$ is driven by a band $B^{11}$ connecting with the pulley $B^6$ on the saw mandrel B. Tension may be applied to this belt $B^{11}$ by a tension pulley $B^8$ which is journaled in a yoke frame $B^9$ pivoted to the frame C by a supporting frame $B^{10}$.

The operation of this variable friction feed for sawmills works as follows: The mandrel carrying the circular saw is driven by suitable power through the pulley $B^7$; thus revolving the disk $C'$ by means of the pulley $B^6$, the disk pulley $C^{11}$ and belt $B^{11}$. In order for the revolving disk $C'$ to engage the friction roller $C^2$, it is necessary for the operator in gripping the handle $E^4$ to press the pivoted secondary handle $E^{13}$ inwardly; this pulls up the crank collar $E^3$, which, by means of its cam shaped teeth, forces the yoke $E^{16}$ to the left of the husk frame. This yoke, by means of the thrust shaft $E^8$ presses against the adjusting screw $E^9$, which in turn causes the pivoted lever $E^{10}$ to force the disk $C'$ against the friction roller $C^2$. This latter action is done by means of the upper end of the pivoted lever $E^{10}$ bearing against the outer end of the disk shaft $C^8$. In this manner, the friction roller $C^2$ is caused to revolve, which in turn revolves the bevel gear $C^5$ by means of bevel pinion $C^4$. The bevel gear $C^5$, by means of its shaft $C^{12}$, and pinion $C^6$, causes the spur gear $D'$ to revolve, which being made fast to the drum shaft D, in turn causes the drum $D^3$ to revolve. The sawmill carriage receives its motion from this drum $D^3$, by means of a wire cable or rope, which revolves around the drum in the usual manner.

In order to stop the sawmill carriage at any point, all that is necessary is for the operator to release the latch handle $C^{13}$. In order to reverse the movement of the carriage, the operator moves the lever $E^4$ until the friction pulley $C^2$ crosses to the opposite side or across center of disk $C'$.

It will be seen that the speed of the sawmill carriage can be varied in accordance with the distance the friction roller $C^2$ is moved away from the center of the disk $C'$. In other words, the nearer the outer edge of the disk the friction pulley works, the faster will be the movement of the carriage, and vice versa.

One of the very important features of this device is that the sawmill carriage can be stopped at any point by merely releasing the pivoted secondary handle E¹³; and no matter what position the friction pulley C² occupies on the face of the disk C', nor what position the lever E⁴ may be in, this latch handle can always be loosened to stop the movement of the carriage, or pressed in to start the carriage.

I have shown my invention in the form which I have found most excellently adapted for commercial practice, and while I prefer said construction, I do not restrict myself thereto, as the details may be modified without departing from the spirit of the invention.

Having now described my invention, what I claim as new, and desire to secure by Letters Patent, is:—

1. In a variable friction feed, the combination of a driven shaft, a friction roller mechanically connected to rotate the driven shaft, a rotating friction disk for driving the friction roller, a primary hand operated part movable in one plane only, a connection from the primary hand operated part for shifting the friction roller transversely to the axis of the friction disk to change its speed, a secondary hand operated part carried by the primary hand operated part, and connecting devices from said secondary hand operated part to the friction disk for shifting it axially toward the friction roller for putting the friction roller into rotation or permitting it to come to rest.

2. In a variable friction feed, the combination of a driven shaft, a friction roller mechanically connected to rotate the driven shaft, a rotating friction disk for driving the friction roller, a pivoted lever having a primary hand operated part movable in one plane only, a connection from the primary hand operated part for shifting the friction roller transversely across the axis of the friction disk to change its speed and direction of rotation, independently movable devices on the hand operated part of the pivoted lever, and connecting devices from said independently movable devices to the friction disk for shifting it axially toward the friction roller for putting the friction roller into rotation or bringing it to rest, said operations requiring a movement of the pivoted lever and its hand operated part in one plane only.

3. In a variable friction feed, the combination of a driven shaft, a friction roller mechanically connected to rotate the driven shaft, a rotating friction disk for driving the friction roller having a shaft adjustable longitudinally, a lever to move the shaft for forcing the friction disk into driving contact with the friction roller, a pivoted hand lever having a hand operated part movable in one plane only, an extensible power transmitting mechanism for operating the lever which moves the shaft said extensible part connecting with the hand lever adjacent to its pivotal point, means on the hand operated part of the hand lever for operating the extensible part without changing the direction of movement of the hand lever, a yoke for shifting the friction roller, and means connecting the yoke with the hand lever.

4. In a variable friction feed, the combination of a frame having two sets of bearings respectively at right angles to each other, a friction disk having a shaft journaled in one set of the bearings and movable axially therein, a shaft journaled in the other set of the bearings and having a longitudinal groove, a friction roller sleeved upon the grooved shaft and adapted to be driven by the friction disk, a loose feather connecting the friction roller with the groove of the shaft, a yoke having two bearings sliding on the grooved shaft and carrying between the bearings the friction roller and feather, a pivoted hand lever, a connection between the hand lever and yoke whereby the friction roller may be adjusted transversely to the axis of the friction disk, and means extending to the pivoted hand lever for shifting the friction disk and its shaft axially to bring it into or out of contact with the friction roller.

5. In a variable friction feed, the combination of two sets of bearings respectively at right angles to each other, a friction disk having a shaft journaled in one set of the bearings and movable axially therein, a shaft journaled in the other set of the bearings and having a longitudinal groove, a friction roller sleeved upon the grooved shaft and adapted to be driven by the friction disk, a loose feather connecting the friction roller with the groove of the shaft, a yoke having two bearings sliding on the grooved shaft and carrying between it the friction roller and feather, a pivoted hand lever having a hand operated part movable in one plane only, a connection between the hand lever and yoke whereby the friction roller may be adjusted transversely to the axis of the friction disk, and means for shifting the friction disk and its shaft axially to bring it into or out of contact with the friction roller consisting of a part hinged to the hand operated part of the hand lever and movable in the same plane thereof and connecting devices from said hinged part to the shaft of the friction disk for adjusting said friction disk and its shaft axially by the movement of the hinged part relatively to the hand lever.

6. In a variable friction feed, the combination of a driven shaft, a frame comprising an integral casting having two sets of bearings respectively at right angles to each other, a friction disk having a shaft journaled in one set of the bearings and movable axially therein, a shaft journaled in the other set of the bearings and having a longitudinal groove, power transmitting connections from the last mentioned shaft to the driven shaft for operating it, a friction roller sleeved upon the grooved shaft and adapted to be driven by the friction disk, a feather connecting the friction roller with the groove of the shaft, a yoke having two bearings sliding on the grooved shaft and carrying between its bearings the friction roller and feather, a pivoted hand lever movable in one plane only, a connection between the hand lever and yoke whereby the friction roller may be adjusted transversely to the axis of the friction disk, a hand operated part carried by the hand lever and capable of having an independent movement but in the same plane of movement as that of the hand lever, and means connecting said hand operated part with the shaft of the friction disk for shifting the said shaft and disk axially for each movement of the hand operated part upon the hand lever.

7. In a variable friction feed, the combination of a driven shaft, a frame having two sets of bearings respectively at right angles to each other, a friction disk having a shaft journaled in one set of the bearings and movable axially therein, a shaft journaled in the other set of the bearings and having a longitudinal groove, power transmitting connections from the last mentioned shaft to the driven shaft for operating it, a friction roller sleeved upon the grooved shaft and adapted to be driven by the friction disk, a feather connecting the friction roller with the groove of the shaft, a yoke having two bearings sliding on the grooved shaft and carrying between its bearings the friction roller and feather, a pivoted hand lever movable in one plane only, a connection between the hand lever and yoke whereby the friction roller may be adjusted transversely to the axis of the friction disk, a hand operated part carried by the hand lever and capable of having an independent movement but in the same plane of movement as that of the hand lever, and means connecting said hand operated part with the shaft of the friction disk for shifting the said shaft and disk axially for each movement of the hand operated part upon the hand lever said connections extending adjacent to the axis of the hand lever whereby the oscillations of the hand lever in shifting the yoke and friction roller will not operate the friction disk and its shaft.

8. In a variable friction feed, the combination of a rotating friction disk, with a friction roller, a single hand lever device having a primary hand operated part movable in one plane only, connections from the hand lever for producing a relative adjustment of the friction roller to the friction disk transversely to the axis of the disk, a secondary hand operatable part carried by the primary hand operated part of the lever, adjusting means for causing a relative adjustment of the friction disk and friction roller to or from each other operated by the secondary hand operatable part, a driven shaft, and connecting power transmitting devices from the friction roller to the driven shaft.

9. In a variable friction feed, the combination of a rotating friction disk, with a friction roller, a single hand lever device having a primary hand operated part movable in one plane only, connections from the hand lever for producing a relative adjustment of the friction roller to the friction disk transversely to the axis of the disk, a secondary hand operatable part carried by the primary hand operated part of the lever, adjusting means for causing a relative adjustment of the friction disk and friction roller to or from each other, connections between the secondary hand operatable part and the adjusting means for controlling the adjustment of the friction roller and the friction disk to or from each other independent of the relative adjustment of the friction roller with respect to the axial line of the friction disk, a driven shaft, and connecting power transmitting devices from the friction roller to the driven shaft.

10. In a variable friction feed, the combination of a rotating friction disk, with a friction roller, a single hand lever device movable in one plane only and connections for producing a relative adjustment of the friction roller to the friction disk transversely to the axis of the disk and also for causing a relative adjustment of the friction disk and friction roller to or from each other, means for controlling the adjustment of the friction roller and friction disk to or from each other independent of the relative adjustment of the friction roller with respect to the axial line of the friction disk consisting of a pivoted part on the hand lever and movable in the same plane as the hand lever, and a connection from said pivoted part to the friction disk and its shaft and extending adjacent to the axis of the hand lever.

11. In a variable friction feed, the combination of a shaft, power devices for rotating the said shaft, devices for controlling the speed of said shaft and for putting the power devices in and out of operation including a hand lever arranged to oscillate in one plane only and provided with a pivoted handle movable with the hand lever, connecting means between the lever and the devices for controlling the speed of said shaft, and connections between the pivoted handle and the means for putting the power devices in and out of operation, whereby a movement of the hand lever and pivoted handle device in a single plane may control the operation of the feed as to time of action and speed.

12. In a variable friction feed, the combination of a shaft, power devices for rotating the said shaft, devices for controlling the direction of rotation of said shaft, means for putting the power devices in and out of operation including a hand lever arranged to oscillate in one plane only provided with a hand operated movable part movable with the hand lever, connecting means between the lever and the devices for controlling the direction of rotation of said shaft, and connections between the hand operated movable part and the means for putting the power devices in and out of operation, whereby a movement of the hand lever and hand operated movable part in a single plane may control the operation of the feed as to time of action and speed.

13. In a variable friction feed, the combination of a driven shaft, means for varying the speed of rotation of the driven shaft, means for stopping and starting the rotation of the driven shaft including a single hand lever device arranged to oscillate in one plane only, connections from said hand lever device for controlling the means for varying the speed of the driven shaft, a hand operated device supported on the hand lever, and means extending from the hand operated device for stopping and starting the rotation of the driven shaft, whereby both of said operations are controlled by a movement of the hand lever and latch devices in a single plane.

14. In a variable friction feed, the combination of a main frame, a driven shaft, a spur gear $D'$ thereon, a frame C adapted for attachment to the main frame and provided with parallel bearings $C^{15}$ and $C^{16}$ and bearings $C^{17}$ at right angles and fixedly arranged with respect to the bearings $C^{16}$, shaft $C^{12}$ in the bearings $C^{15}$, a pinion $C^6$ on the shaft $C^{12}$ and meshing with the spur wheel $D'$, a bevel gear $C^5$ also secured to the shaft $C^{12}$, a shaft $C^3$ journaled in the bearings $C^{17}$, a bevel pinion $C^4$ meshing with gear $C^5$ and secured to the shaft $C^3$, a sliding friction roller $C^2$ carried by the shaft $C^3$ and arranged to rotate it, shaft $C^8$ journaled in the bearings $C^{16}$ and longitudinally adjustable, a friction disk $C'$ on the shaft $C^8$ and with which the friction roller engages, primary hand operated means for sliding the friction roller along its shaft $C^3$, and means for adjusting the shaft $C^8$ and friction disk to or from the friction roller consisting of a longitudinally adjustable and rotatable part, a lever operated by said part for shifting the shaft of the disk which drives the friction roller to move said disk to and from the said roller, and a secondary hand operated means carried by the primary hand operated means for operating the longitudinally adjustable and rotatable part.

15. In a variable friction feed, the combination of the driven shaft, a friction roller, power transmitting devices between the friction roller and driven shaft, a friction disk to rotate the friction roller, a shaft for the friction disk, a primary hand operated part and connections for adjusting the friction roller transversely to the axis of the disk, a lever having one end operating upon the shaft of the disk for shifting it axially, a shaft independent of the shaft carrying the friction roller to move the other end of the lever to rock it, a movable cam for giving the shaft a movement in the direction of its axis, a secondary hand operated part on the primary hand operated part, and connections between the secondary hand operated part and cam whereby the cam may be operated from all positions of the primary hand operated part and said part at all times movable in one plane only.

In testimony of which invention, I have hereunto set my hand.

HERBERT M. LOFTON.

Witnesses:
T. T. SMITH, Jr.,
E. A. DORR.